Dec. 11, 1956   H. C. VOSS   2,773,547
ROLLER MOUNTING FOR TARPAULINS
Filed Sept. 11, 1953   2 Sheets-Sheet 1
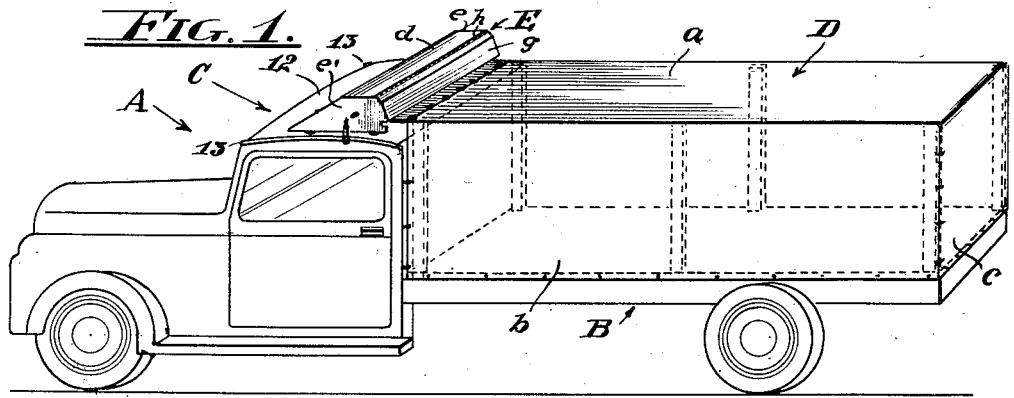
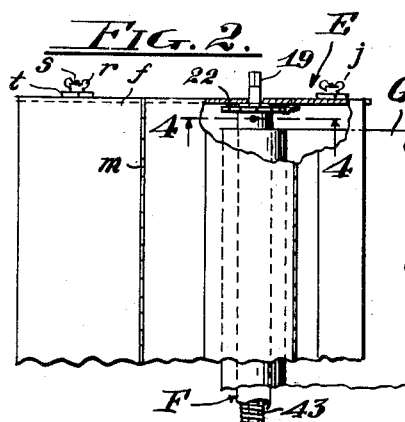
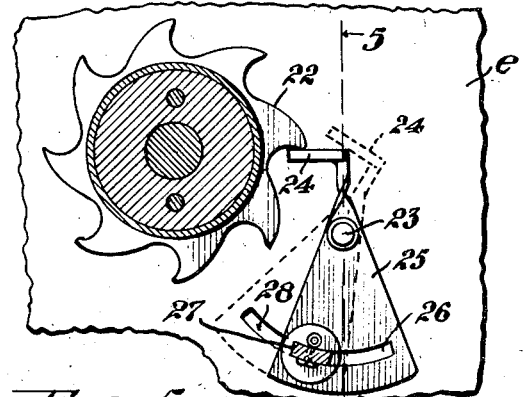
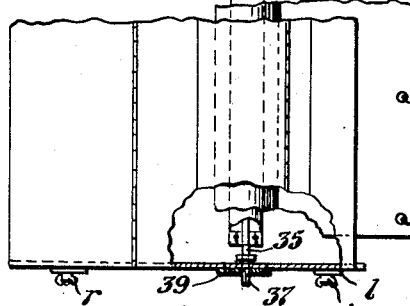
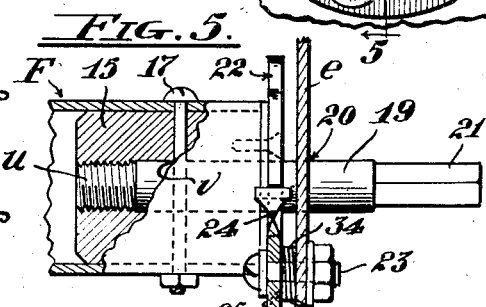
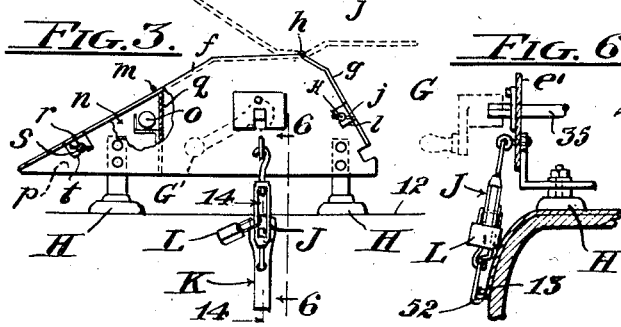
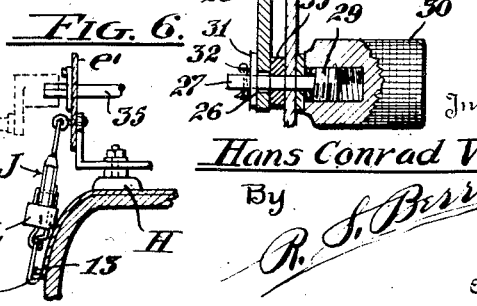
Inventor
Hans Conrad Voss;
By
Attorney

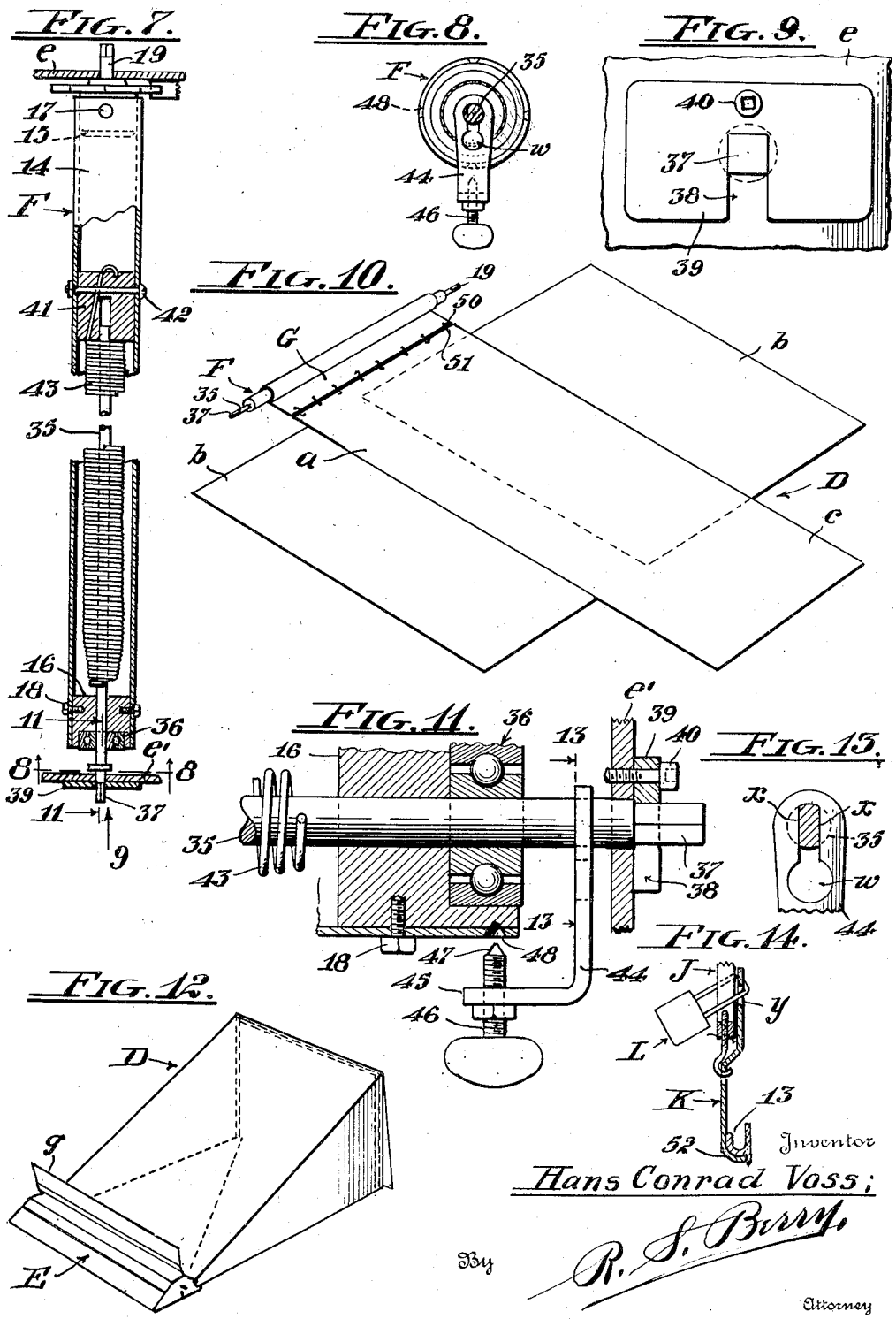

United States Patent Office 2,773,547
Patented Dec. 11, 1956

2,773,547

ROLLER MOUNTING FOR TARPAULINS

Hans Conrad Voss, Los Angeles, Calif.

Application September 11, 1953, Serial No. 379,520

3 Claims. (Cl. 160—301)

This invention relates to a roller mounting for tarpaulins and the like such as are employed in covering truck bodies to protect objects loaded on a truck from the elements. Tarpaulins used for this purpose are usually quite bulky and heavy and accordingly are cumbersome to handle so as to call for the exercise of considerable effort in their application and removal and particularly when they are being manipulated where subjected to the action of wind or exposed to rain or snow, or have to be lifted to overhead positions. Truck covers of this character are usually folded in bundles and stored in any convenient place on a truck or in a warehouse when not in use. This practice occasionally results in the tarpaulins being mislaid and left off the truck and renders it subject to being stolen.

It is therefore the primary object of the invention to provide a mounting for a tarpaulin whereby it may be readily reeled on a roller and enclosed in a protective housing when not in use and be easily unwound from its roller mounting and applied to its truck body covering position.

Another object is to provide a mounting for the tarpaulin whereby it is maintained attached to a truck when not in use and in a fashion such that it may not be easily purloined yet which will permit of ready removal and replacement of the tarpaulin should occasion require.

While it is common practice to wind flexible sheets of fabrics on rollers particularly in case of curtains and to either power the roller with a winding spring as in the case of curtain rollers, or to perform the reeling operation by man power through the medium of a crank actuated roller, it has been found more desirable in the handling of truck tarpaulins to employ a combination of spring action and man power in actuating the roller to reel the tarpaulin thereon because of the considerable length and weight of the tarpaulin and particularly where the latter is wet, and by which arrangement the spring power and man power may be utilized to supplement each other.

It is therefore another object of the invention to provide a construction in the tarpaulin receiving roller whereby it may be actuated either by spring action or man power or by the combined action of spring and man power.

Another object is to provide a spring actuated roller fitted with a pawl and ratchet mechanism whereby the roller may be held against rotation in one direction in opposition to a spring in which means are provided for placing the pawl and ratchet mechanism out of operation so that the roller may be freely turned in either direction and also whereby the pawl and ratchet may be locked to hold the roller against rotation in either direction.

Another object is to provide a means whereby the spring in a spring actuated roller may be adjusted to vary its tension from minimum to maximum or vice versa, and to also provide a construction whereby the spring may be placed out of operation so that the roller may be rotated in either direction independent of the spring.

Another object is to provide a housing for the roller and for a tarpaulin wound thereon together with a mounting for the roller adapted to permit ready removal and replacement of the latter.

With the foregoing objects in view together with such other objects and advantages as may subsequently appear the invention resides in the parts and in the combination, construction and arrangement of parts hereinafter described and claimed, and as illustrated by way of example in the accompanying drawing in which:

Fig. 1 is a perspective view showing the invention as applied to a truck with the tarpaulin disposed in its covering position;

Fig. 2 is a plan view of the roller and tarpaulin housing with portions broken away;

Fig. 3 is an end of the housing shown in Fig. 2;

Fig. 4 is a detail in section and elevation viewed on the line 4—4 of Fig. 2 in the direction indicated by the arrows;

Fig. 5 is a detail in section and elevation taken on the line 5—5 of Fig. 4 as seen in the direction indicated by the arrows;

Fig. 6 is a view in section and elevation as seen on the line 6—6 of Fig. 3 illustrating a preferred mode of attaching the housing to the top of the truck cab;

Fig. 7 is a horizontal section and partial plan view of the spring actuated roller and its end mountings;

Fig. 8 is a detail in section and elevation viewed on the line 8—8 of Fig. 7 in the direction indicated by the arrows;

Fig. 9 is a front view of one of the roller end mountings as seen in the direction indicated by the arrow 9 in Fig. 7;

Fig. 10 is an isometric view diagrammatically depicting the tarpaulin and its mode of attachment to a roller;

Fig. 11 is a section taken on the line 11—11 of Fig. 7;

Fig. 12 is a perspective view illustrating a manner in which the tarpaulin and its mounting may be utilized in forming a tent structure apart from a truck;

Fig. 13 is a section taken on the line 13—13 of Fig. 11; and

Fig. 14 is a section taken on the line 14—14 of Fig. 3.

Referring to the drawings more specifically A indicates generally a truck which embodies a body portion B and a cab C located at the forward end of the body portion and having a top wall 12 formed with side gutter flanges 13—13. D indicates a conventional tarpaulin for positioning over a load carried on the truck body B and which tarpaulin embodies a central section $a$, side aprons $b$—$b$ and an end flap $c$ which, when the tarpaulin is disposed in its covering position as shown in Fig. 1 are arranged with the portion $a$ extending over the load with the aprons $b$—$b$ extending downwardly at each side of the load and with the end flap $c$ extending downwardly over the outer end of the load with the tarpaulin held in place by straps or snap fasteners in the usual manner.

In carrying out the invention a housing E is provided for mounting on the top wall 12 of the cab C which housing is here shown as embodying a top wall $d$, end walls $e$—$e'$, a front wall $f$ and a back wall $g$. The top wall $d$ of the housing E is substantially rectangular as is the front wall $f$ which latter leads downwardly at an inclination from its intersection with the forward edge of the top wall $d$ so as to minimize wind resistance on the front of the housing E as when the truck on which the housing is mounted is advancing. The end walls $e$—$e'$ extend vertically in parallel relation to each other from the end margins of the top and front walls $d$ and $f$. The back wall $g$ extends between the end walls $e$—$e'$ and is hingedly connected to the rear margin of the top wall $d$ by a piano hinge $h$ whereby it may be swung to an elevated position as indicated in dotted lines in Fig. 3 but which is normally seated on the rear marginal portions of the end walls e—e' and engaged by wing nuts j screwed on threaded stems k mounted on the end walls e—e' and arranged for engagement with slotted plates l depending from the end margins of the wall g when the wing nuts j are loosened and the wall g is in its lowered position and seated on the end walls e—e'.

The inclined front wall f is divided longitudinally and has its lower portion hinged at m to provide an upwardly swinging cover for a compartment n provided for the storage of a supplemental roller o and also for reception of ropes, tools, cranks, and other equipment; the compartment o having a bottom wall p and a back wall q. The cover thus formed is detachably fastened in its closed position by wing nuts r screwed on a stem s mounted on the end walls e—e' and arranged for engagement with slotted plates t depending from the end margins of the cover portion of the wall f when in its lowered position.

Mounted within the housing E and revolubly supported on the end walls e—e' is a roller F having a length slightly exceeding the width of the central section a of the tarpaulin D and on which the tarpaulin D is designed to be wound as will later be described.

The roller F comprises a length of metallic tubing 14 in the ends of which are fitted tubular plugs 15 and 16 detachably held in place respectively by a bolt 17 and screw 18. Extending into the outer end of the plug 15 axially of the roller F is a stem 19 having a threaded inner end portion u screwed into engagement with the plug 15 and having a transverse bore v through which the bolt 17 extends and by which the stem 19 is securely anchored to the end of the roller. The outer end portion of the stem 19 projects through and bears in a circular opening 20 in the adjacent housing end wall e from which the outer end portion of the stem being squared as indicated at 21 for engagement with a detachable crank G indicated in dotted lines in Fig. 3 whereby the roller F may be manually rotated.

Affixed to the outer end of the plug 15 is a ratchet wheel 22 which extends alongside the inner face of the end wall e contiguous thereto and mounted on a pivot pin 23 carried by the end wall e is a pawl 24 adapted to be moved in and out of engagement with the teeth of the ratchet 22; the pawl 24 having a depending arm portion 25 formed with an elongated arcuate slot 26 concentric with the pivot pin 23 through which extends a stem 27 projecting through an arcuate slot 28 in the wall e aligned with the slot 26 and which stem is formed with a threaded outer end portion 29 which is screwed into engagement with a knurled handle 30.

The inner end portion of the stem 26 carries an abutment 31 which overlies and abuts the arm 26 which abutment is here shown as comprising a washer encompassing the stem 27 and held in place by a cotter-pin 32. A washer 33 encompasses the stem 27 between the outer face of the arm 25 and the wall e in sliding contact therewith. A coil spring 34 wound around the pivot pin 23 adjacent the inner face of the wall e has one end arranged to bear on the pawl 24 and the other end attached to the wall e and which spring is tensioned to normally dispose the pawl 24 in operative engagement with the ratchet 22 when the arm 25 on the pawl is free to move, that is when the handle 30 is sufficiently loose on the threaded end 29 of the stem 27 to permit swinging movement of the arm 25 independent of the stem 27. By tightening the handle on the stem 27 the arm 25 may be clamped against movement with the pawl 24 disposed either in or out of engagement with the ratchet; the stem 27 being movable in the arcuate slot 28 to move the arm 25 to a position wherein the pawl 24 is disposed for engagement with the ratchet as shown in full lines in Fig. 4 clear of the ratchet as indicated in dotted lines in Fig. 4. When the pawl 24 is thus disposed the roller is free to rotate in either direction independent of the pawl and ratchet mechanism.

Extending axially of the roller F is a rod 35 one end of which projects through the tubular plug 16 beyond the outer end of the roller F and is supported by ball bearings 36 carried by the latter; the end portion of the rod 35 terminating in a rectangular extension 37 which seats in an open ended rectangular slot 38 formed in a plate 39 detachably secured to the outer face of the adjacent end wall e' by a screw 40 by which mounting the rod 35 is held stationary. The inner end portion of the rod 35 is seated in a plug 41 rigidly secured in the roller F by a bolt 42.

Wound around the rod 35 is a coil spring 43 extending between the plugs 16 and 41 one end of which spring is affixed to the plug 41 and the other of which is affixed to the rod 35 contiguous the plug 16; the spring 43 being adapted to be tensioned to effect rotation of the roller F relative to the rod 35. Tensioning of the spring 43 and regulating of the tension thereof is accomplished by rotating the roller F relative to the rod 35 while the latter is held stationary; rotation of the roller being effected when the roller is mounted within the housing E by means of a crank attached to the outer end of the stem 19 while the pawl 24 is in spring pressed engagement with the ratchet 22.

Means are provided for holding the rod 35 stationary relative to the roller F when the latter is demounted, which means comprises an arm 44 affixed to the rod 35 as particularly shown in Figs. 11 and 13; the arm 44 having a key-hole slot w and the rod 35 having opposed channels x with which the reduced end of the slot w is engaged. The arm 44 extends laterally of the roller F contiguous the adjacent end thereof and has a flange 45 on its outer end overlying the roller in spaced but proximate relation thereto. Threaded in the flange is a wing screw 46 having a tapered end 47 engageable with one of a series of sockets 48 spaced apart in a row circumferentially of the roller. The screw 46 when engaged with a recess 48 serves to lock the roller and rod 35 relative to each other so as to prevent rotation of the roller F under the urge of the spring 43 while the roller is demounted. On mounting the roller and locking it against rotation under the urge of the spring 43 by the pawl 24 and ratchet 22 the wing screw 46 is disengaged from the roller so that the spring 43 will then impose a thrust on the roller in its winding direction and yieldably oppose rotation of the shaft F in the unwinding direction thereof.

Affixed to the roller F is a short flexible feeder strip G particularly shown in Fig. 10 which feeder strip has a width at least substantially corresponding to that of the middle section a of the tarpaulin D the inner end of which is removably connected to the feeder strip G by means of a series of wire hooks 50 on the outer end of the feeder strip G which are detachably engaged with eyelets 51 on the inner end of the tarpaulin.

The housing E is designed to be rigidly mounted on the top 12 of the cab C which may be effected in any desired manner. As here shown the housing is fitted with a pair of rubber tipped legs H mounted on the end walls e—e' and adapted to seat on the top wall 12 of the cab to support the housing E in a slightly elevated position relative to the top of the cab. A turn-buckle J is attached to each of the end walls e—e' to depend therefrom and affixed to the lower end of the turn-buckle is a plate K formed with a hook 52 engageable with the gutter flange 13 whereby on tightening the turn-buckle the housing E may be securely clamped in its seated position on the cab top. As a means for preventing unauthorized easy removal of the housing E, means are provided for locking the turn-buckle against operation after tightening thereof, here shown as comprising a conventional pad-lock L, the hasp of which is engageable with the turn-buckle link and with the upper end of the plate K so as to prevent rotation of the turn-buckle when the pad-lock is in place; the plate K being formed with an aperture y through which the pad-lock hasp extends. This arrangement prevents loosening of the turn-buckle by vibration.

In the application and operation of the invention for the purpose for which it is primarily intended, namely, to afford a mounting and housing for truck tarpaulins, the housing E is attached to the cab roof 12 either before or after connecting the central section $a$ of the tarpaulin D to the leader strip G fixed to the roller F; the tarpaulin side aprons $b$—$b$ being initially folded over the middle section $a$ and wound with the latter on the roller F. The operation of winding the tarpaulin F may be accomplished either by spring power, man power or the combination of both. In effecting the winding operation by spring power the spring 43 is initially tensioned as before described by rotating the roller F relative to the rod 35 by rotating the stem 19. In this operation the spring 43 acts to wind the folded tarpaulin on the roller F in the manner common in spring actuated rollers. The spring is preferably tensioned by winding the roller through the medium of a crank while the rod 35 is held stationary until the spring is initially wound whereupon the roller is temporarily held against unwinding under the urge of the spring by adjusting the pawl 24 into locking engagement with the ratchet 22 so as to hold the spring in its wound position while attaching the tarpaulin thereto. On disengaging the pawl from the ratchet the spring will effect its winding action. In event the spring should be ineffectual in completing its winding action or should be inadequate because of load imposed thereon, as when the tarpaulin is wet, the action of the spring 43 may be augmented or supplemented by man power by engaging the wing screw 46 with the roller F to hold the latter against rotation relative to the rod 35 then freeing the plate 39 by disengaging the screw 40 from the end wall $a'$ whereupon by applying the crank either to the stem 19 or outer end of the shaft 35 both the roller F and the shaft or rod 35 may be rotated collectively by man power to wind the tarpaulin or any portion thereof on the roller F after which the wing screw 40 is disengaged from the roller if it is desired to place the spring 43 back in operation, or if desired the roller may be maintained in interengagement with the rod 35 when winding and unwinding of the roller F independent of the spring 43. In this instance the plate 39 is removed so that the rod 35 may rotate in its mounting on the end wall $e'$. If it is desired to render the roller F free wheeling in either direction the pawl 24 is locked out of engagement with the ratchet 22 by manipulation of the handle 30 and when it is desired to lock the roller against rotation in either direction the pawl is locked in its advanced position by manipulation of the handle 30. When it is desired that the pawl and ratchet function in the usual manner wherein the pawl is adapted to engage the ratchet under spring pressure so as to permit rotation of the roller in its winding direction and inhibit its rotation in its unwinding direction the handle 30 is manipulated to a free position so that the pawl will be free to oscillate and ride in and out of engagement with the ratchet under the urge of its spring 34.

By the provision of the hinged cover $g$ the tarpaulin may be extended upwardly at an inclination relative to the roller F by swinging the cover upwardly or rearwardly to its open position indicated in dotted lines in Fig. 3 which is particularly advantageous where the top of the load on the truck body extends above the cab.

While the invention is primarily intended for use as a roller mounting and cover for truck tarpaulins and to be applied to a truck it is also applicable for use independent of the truck such for example in providing a canopy as by mounting the housing E in an elevated position on a stable structure so that the tarpaulin may be extended outwardly and downwardly therefrom or it may be utilized to provide a tent as shown in Fig. 11 with the housing E seated on the ground and the tarpaulin extended upwardly at an inclination with its outer end portion draped over a supporting frame.

While I have shown and described a specific embodiment of my invention, I do not limit myself to the exact details of construction set forth, and the invention embraces such changes, modifications and equivalents of the parts and their formation and arrangement as come within the purview of the appended claims.

I claim:

1. In a roller mounting for tarpaulins, a tubular roller, a rod extending axially of said roller having an end portion projecting from an end of the roller, a coil spring encompassing said rod within said roller having one end thereof fixed to said roller and another end fixed to said rod, said spring being adapted to be tensioned to effect rotation of the roller relative to the rod and means for temporarily interconnecting the rod and roller to hold the latter against rotation under the urge of said spring embodying an arm affixed to the projecting end portion of said rod, and a screw carried by said arm detachably engageable with said roller.

2. The structure called for in claim 1 in which the arm is formed with a key-hole slot connected to said rod by engaging the sides of the slot with opposed channels on said rod.

3. A roller mounting for a tarpaulin comprising a tubular roller, a plug in each end of said roller and affixed thereto, a crank engaging pin affixed to one of said plugs, a crank engaging rod extending to the other of said plugs projecting axially of said roller, an intermediate plug in said roller affixed thereto on which the inner end of said rod is supported, a coil spring within said roller having one end thereof affixed to said rod and the other end affixed to said intermediate plug adapted on being tensioned to rotate the roller relative to the rod, and means for temporarily interconnecting the rod and roller whereby the roller may be manually operated or rotated independent of said spring; said last named means comprises an arm affixed to said rod having a flange on its outer end overlying the roller, and a screw mounted on said flange movable in and out of engagement with said roller.

References Cited in the file of this patent

UNITED STATES PATENTS

| | | |
|---|---|---|
| 145,821 | Warner | Dec. 23, 1873 |
| 152,065 | Beers | June 16, 1874 |
| 396,463 | Bullard | Jan. 22, 1889 |
| 730,443 | Duchemin | June 9, 1903 |
| 748,641 | Newell | Jan. 5, 1904 |
| 842,936 | Case | Feb. 5, 1907 |
| 911,535 | Bailey | Feb. 2, 1909 |
| 1,126,442 | Fulde | Jan. 26, 1915 |
| 1,719,055 | Herzer | July 2, 1929 |
| 1,749,595 | Mark | Mar. 4, 1930 |
| 2,001,603 | Dollinger | May 14, 1935 |